(12) United States Patent
James et al.

(10) Patent No.: US 6,216,678 B1
(45) Date of Patent: Apr. 17, 2001

(54) METHOD AND APPARATUS FOR GENERATING AND IDENTIFYING MISFIRES

(75) Inventors: John Victor James, Walled Lake; Ryan Lee Baker, Dearborn Heights; Dennis Carl Krzyske, New Boston, all of MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/488,065

(22) Filed: Jan. 19, 2000

(51) Int. Cl.⁷ ........................................... F02P 3/05
(52) U.S. Cl. ..................... 123/594; 123/649; 73/117.3
(58) Field of Search ........................... 123/594, 624, 123/629, 649; 73/117.3

(56) References Cited

U.S. PATENT DOCUMENTS

| | | | |
|---|---|---|---|
| 4,114,852 | * 9/1978 | Rabus et al. | 123/624 |
| 5,189,907 | * 3/1993 | Marino et al. | 73/116 |
| 5,528,931 | * 6/1996 | James et al. | 73/117.3 |
| 5,577,475 | * 11/1996 | DeBacker et al. | 123/417 |
| 5,592,388 | * 1/1997 | Bradshaw et al. | 73/117.3 |
| 5,616,858 | * 4/1997 | Angermeier et al. | 73/117.3 |
| 5,699,253 | * 12/1997 | Puskorius et al. | 73/117.3 |
| 5,732,382 | 3/1998 | Puskorius et al. . | |
| 5,862,506 | * 1/1999 | Lynch et al. | 73/117.3 |
| 5,869,752 | * 2/1999 | Klauber et al. | 73/116 |

* cited by examiner

Primary Examiner—Erick Solis
(74) Attorney, Agent, or Firm—Alan J. Lippa

(57) ABSTRACT

An engine cylinder firing event is intentionally defeated by clipping the flyback voltage of the ignition system primary coil winding under the control of a misfire generator that develops a misfire logic signal from ignition dwell events and user inputs and also develops a signal indicative of which cylinder firing event was defeated.

10 Claims, 3 Drawing Sheets

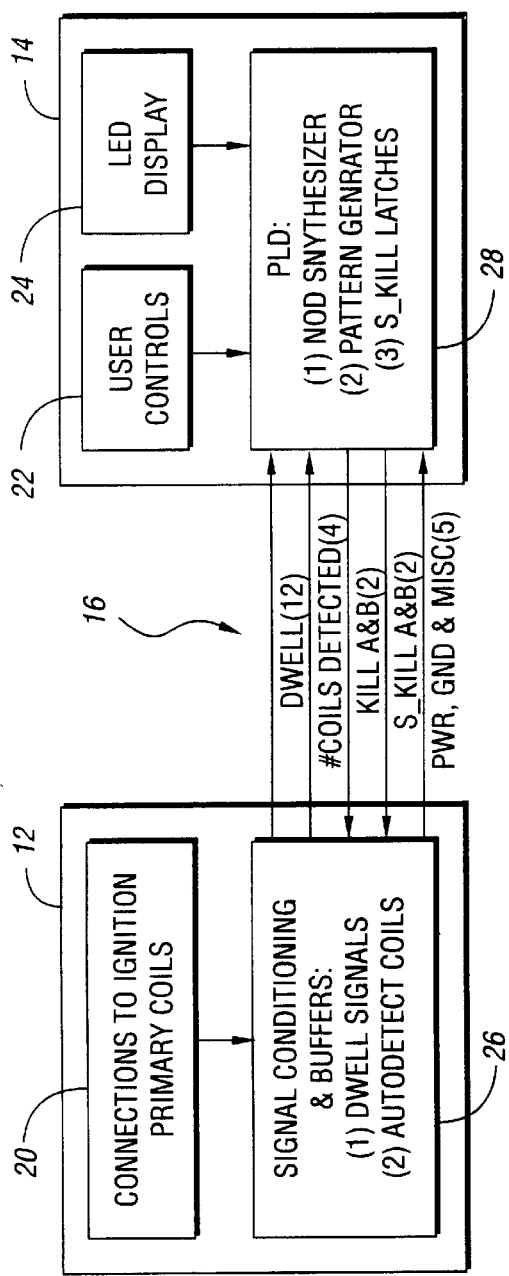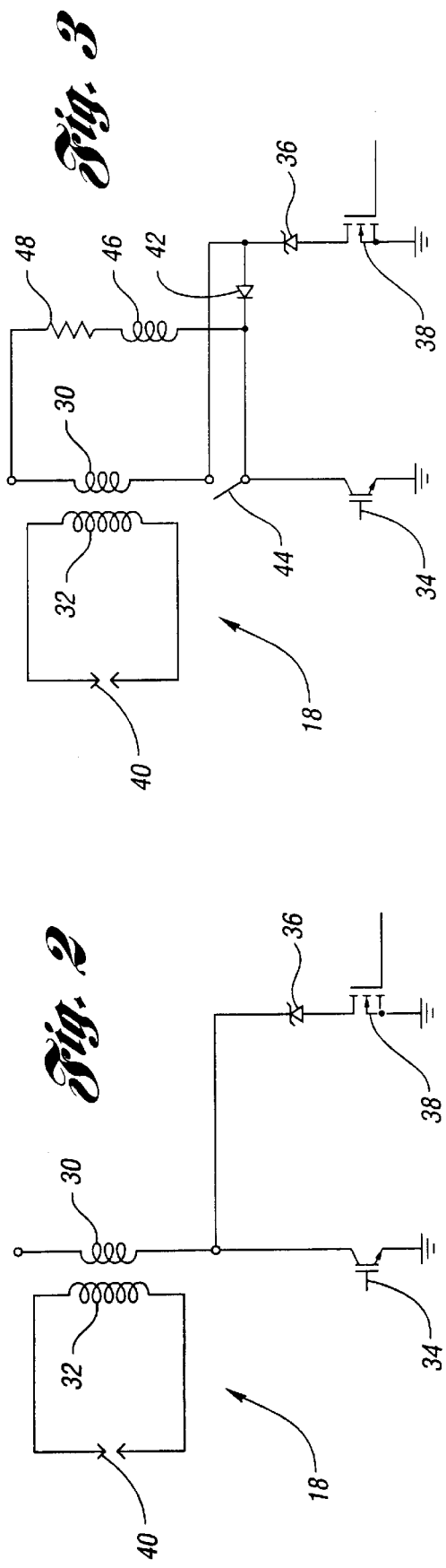

METHOD AND APPARATUS FOR GENERATING AND IDENTIFYING MISFIRES

TECHNICAL FIELD

This invention relates generally to misfire detection and, more particularly, to a method and apparatus for precisely and selectively generating misfires in an engine for use in developing and evaluating misfire detection schemes.

BACKGROUND OF THE INVENTION

Governmental requirements for the onboard diagnostics (OBD) of engine misfires necessitate specialized instrumentation to develop, calibrate, and test misfire detection algorithms. Specifically, equipment designed to induce engine misfires at precisely controlled rates is needed to determine thresholds for emissions and signal detection, and to demonstrate regulatory compliance. This "misfire generator" must interact with the engine's ignition system so as to prevent spark for certain firing events, without affecting the normal firing events before and after each occurrence.

SUMMARY OF THE INVENTION

In accordance with the present invention, a misfire generator is provided that is compatible with most existing ignition systems including those with a distributor, distributorless and coil-on-plug ignitions. When generating misfires, the coil driver's electrical diagnostic is not affected, thereby avoiding possible confusion and unintended interactions between ignition diagnostics and the OBD misfire monitor.

The device of the present invention provides a misfire logic signal for initiating a misfire, and further provides a special version of the misfire logic signal, suitable for recording by a data acquisition system. This latter signal is synchronized to crankshaft position to indicate precisely in the data file which ignition events were induced misfires. The equipment only needs connections to the driven sides of the ignition primaries, as well as power and ground. The misfire generator operates properly with multi-strike ignitions, and overlapping dwell, and is not detected by ignition diagnostics based on either coil primary current or flyback voltage.

The method by which the equipment of the present invention electronically defeats spark is different from prior equipment. Whereas the prior device interrupts primary coil current, the proposed device does not. Rather, it generates misfire by clipping the flyback voltage on the coil primary to far less than the usual several hundred volts when the coil current is interrupted by the coil driver, thus preventing the ignition coil secondary from generating the thousands of volts needed to jump the spark plug gap.

This approach offers several advantages, one of which is that the electronics can generally be connected with only a "T" connection to each coil primary. As a practical matter, this mean that only one jumper connection per coil (rather than two) is required. An exception, discussed below, is when the equipment must be connected with a Y configuration in order to defeat certain types of ignition diagnostics.

BRIEF DESCRIPTION OF THE DRAWINGS

FIG. 1 is a block diagram of the misfire generator of the present invention;

FIG. 2 shows one method of connecting the misfire generator with an engine ignition system;

FIG. 3 show another method of connecting the misfire generator with an engine ignition system;

DETAILED DESCRIPTION OF PREFERRED EMBODIMENTS

Figure 4:
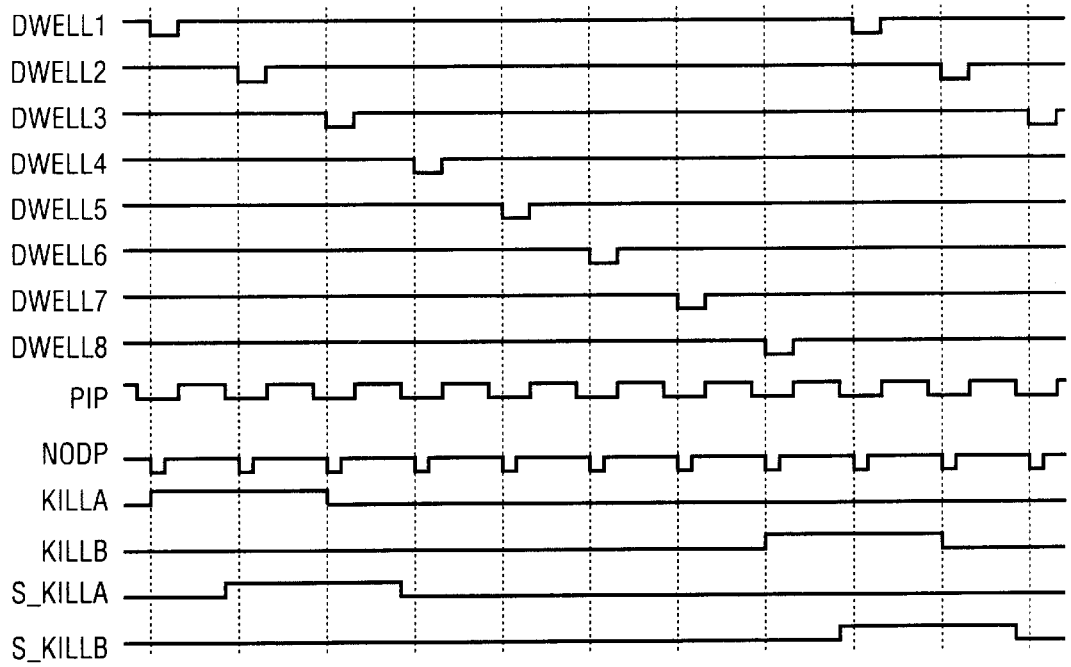
FIG. 4 shows the logic waveforms of the principal signals useful in explaining the invention.
Figure 6:
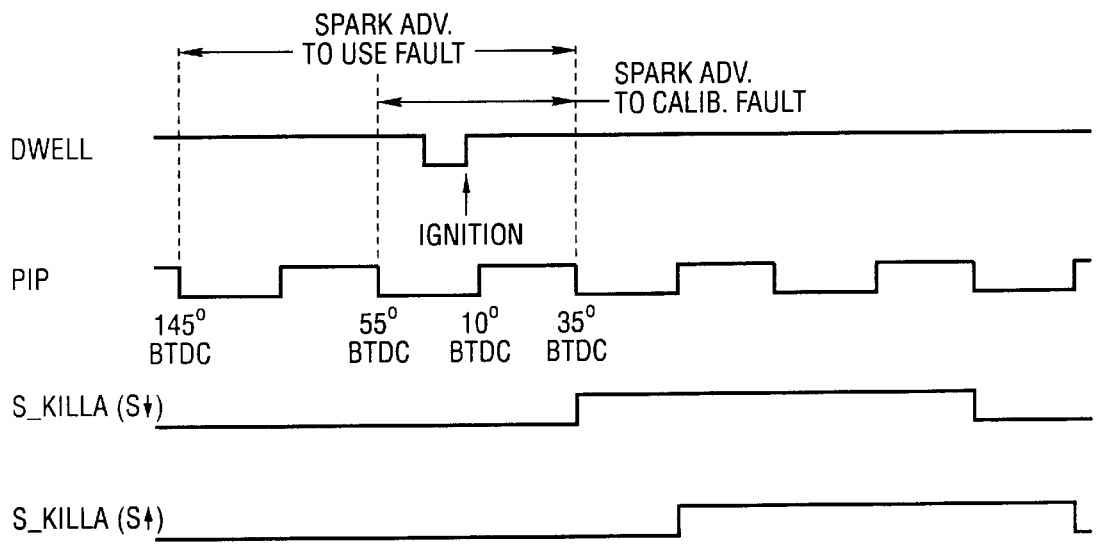
FIG. 6 shows the timing of PIP relative to the DWELL signal from a coil primary.

Referring now to the drawings and initially to FIGS. 1 and 2, the misfire generation equipment generally designated 10 is housed in a coil connection box 12 and a control pendant 14 interconnected by a cable generally indicated at 16. All connections to an ignition system 18, along with power, ground, and optionally a crankshaft position signal referred to hereinafter as PIP are made through the coil connection box 12 and a breakout box 20. The user selects the modes of operation and turns the misfire function on/off using controls 22. An LED display 24 includes a plurality of bicolor LEDs for indicating each coil firing event as normal (green) or misfire (red).

The coil connection box 12 contains interface electronics, i.e., signal conditioning and logic circuitry generally indicated at 26. The signal conditioning circuitry is connected to each ignition coil primary and includes low-pass RC filters that filter the ringing and high voltage spikes caused by the inductance of the ignition coil. The conditioned signals are then passed through buffers with Schmidt trigger inputs to further protect against false triggering, thus providing the DWELL signals to the pendant 14 as shown in FIG. 4. The logic circuitry automatically detects the number of coils in the ignition system and includes peak detectors and a priority encoder that respond to the DWELL signals and provides a 4 bit code to the pendant 14. The KILL SIGNALS for initiating misfire are based on further processing of the DWELL signals in the pendant. The pendant includes a programmable logic device(PLD) 28 the functions of which will be described more fully hereinafter. If desired, a microprocessor may be used in place of the PLD.

Referring to FIG. 2, one method of connecting the misfire generator to an engine ignition system is shown. FIG. 2 shows only a single coil of an ignition systems, but it will be understood that the principles apply to all coils of an ignition system. The ignition coil is represented by primary coil winding 30 and secondary coil winding 32. The power electronics (usually housed in a Powertrain Control Module (PCM)) to drive the primary coil is represented by transistor 34. The portion of the misfire generator shown here is represented by a connection to zener diode 36 and MOSFET transistor 38. When the KILL SIGNAL driving the gate of transistor 38 is low, this transistor is "off" and the ignition system functions normally. During a normal ignition sequence, the coil driver 34 begins conducting and primary current rises from 0 towards a target value (typically 6.5A) over a time period based on coil inductance. This "dwell" time is typically 2–5 ms, depending on ignition type. After the target current is reached, the coil driver 34 is turned off, forcing a sudden drop in coil current. Because of coil inductance, the primary coil 30 develops a high emf (typically ~300V), and because of mutual inductance, the secondary coil 32 generates an even higher emf (depending on winding ratio) which causes a spark to jump the gap in the spark plug 40, initiating combustion.

However, if prior to the spark event, transistor 38 of the misfire generator is turned on by a logic high to its gate from the KILL SIGNAL, the rise in the emf ("flyback voltage")

of the primary coil 30 will be clipped to little more than the breakdown voltage of the zener diode 36 (typically 24V). This in turn limits the voltage on the secondary coil to well below that required for breakdown in the spark plug 40. Thus, misfire occurs. Another way of understanding this is to recognize that the conduction path provided to ground through diode 36 and transistor 38 allows the coil current to continue flowing even after coil driver 34 has shut off. By gradually lowering the current back to 0 (how gradual depends on the zener voltage), this circuit prevents the sudden dI/dt in the coil primary needed to induce a voltage spike in the coil secondary.

It will be understood from FIG. 2 that the misfire generator does nothing to prevent the flow of current within the coil primary 30 or its driver 34. Hence, any current sense implemented in the driver circuit (e.g., emitter current to ground of transistor 34) will not be affected by the action of the misfire generator circuit. However, an ignition diagnostic based on the flyback emf of the primary will note the absence of a voltage spike at the collector of transistor 34 and report an anomaly. This type of diagnostic is included in certain ignition systems.

In order to avoid a false report, a slightly more sophisticated connection method is provided in a second embodiment shown in FIG. 3. Whereas the previous circuit used a "T" connection to the coil primary 30, this alternate method routes the coil primary current through a diode 42 in the misfire generator before returning to ground through the coil driver 34. This connection topology is commonly known as a "Y" connection. An interruptible breakout box indicated at 44, if used, should be in the open position as shown. The addition of an inductor 46 to the misfire generator causes a several hundred volt spike to appear on the collector of coil driver 34 when it shuts off, thereby causing an ignition diagnostic to see the flyback voltage expected from the coil primary. Resistor 48 (along with the internal resistance of inductor L1) limits the current through inductor 46 to a very small value (~65 mA), which is a mere 1% of the current flow in the ignition coil 30. But because the inductance of inductor 46 is relatively high (33 mH), interrupting this small current still produces a large flyback emf (~300V).

In practice, the circuit of FIG. 2 is duplicated 12 times in the connection box to accommodate engines with as many as 12 ignition coils. The box may be wired into the ignition via either "Y" or "T" connections, depending on whether or not the ignition diagnostic monitors flyback voltage. If appropriate, the "T" configuration is preferred since it requires half as many connections and does not require interrupting the signal path to the coils.

Equally important to misfire generation is the timing which controls the process. Since misfires must not affect previous or subsequent firing events, control logic must turn the MOSFETs on/off at the right times. For simplicity, the control of all 12 coils can be performed with just two MOSFETS by diode summing groups of 6 coils together. For timing reasons, the two groups consist of odd and even coils in terms of firing sequence. In this discussion, all coils are labeled by their order (SEQ) in the firing sequence, not by the physical numbering of the cylinders to which they are connected. Hence, coil #1 drives cylinder #1, coil #2 drives whichever cylinder fires next, and so forth.

Figure 5:
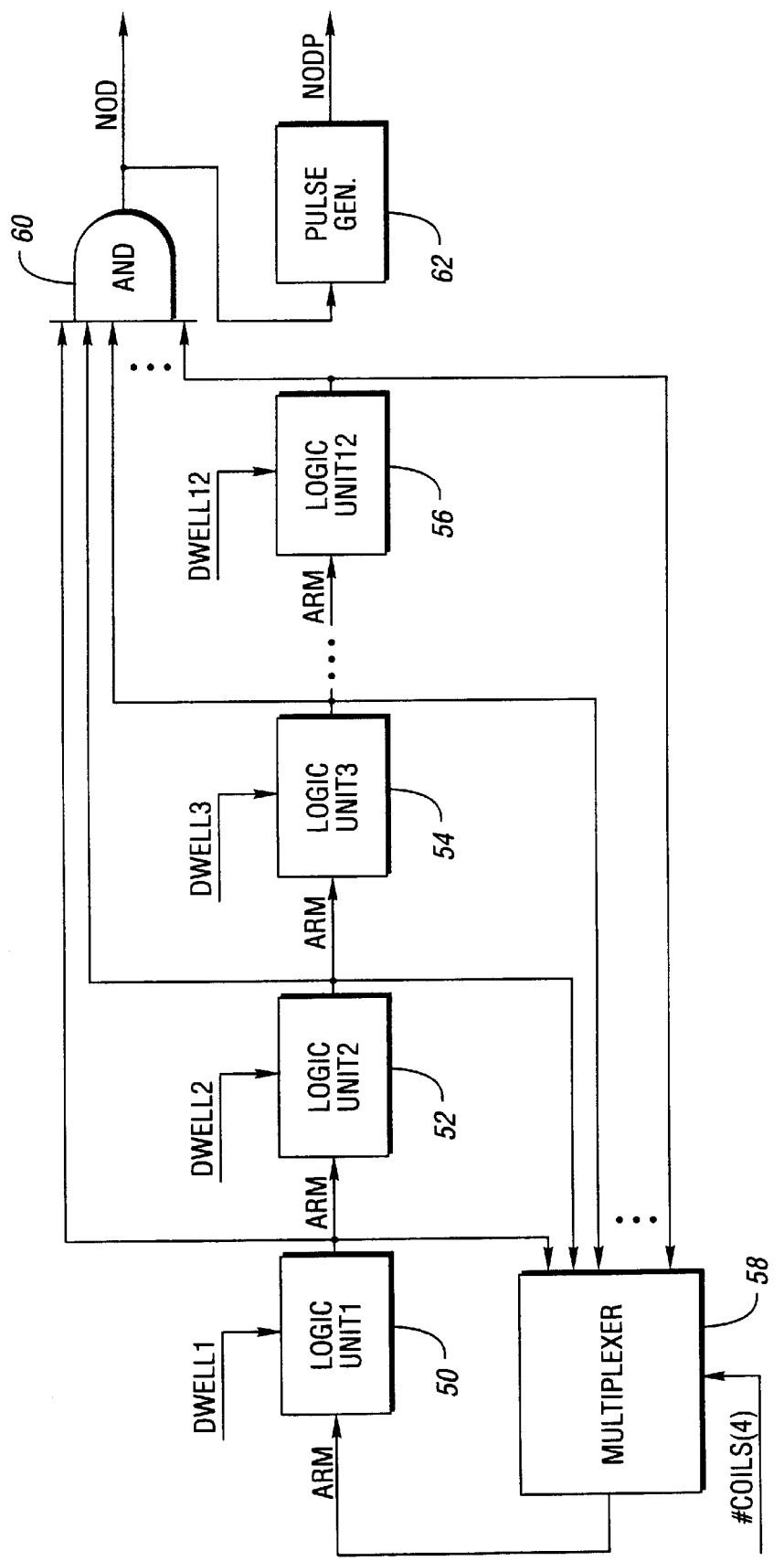
FIG. 5 is a block diagram of the logic for generating a non-overlapping dwell signal.

The PLD 28 performs three principal functions. It takes the buffered dwell signals from each of the ignition coils and synthesizes a Non-Overlapping Dwell (NOD) signal. This NOD signal resembles a combined dwell signal from all coils, except that multiple dwell periods for a single combustion event (i.e., "multi-strike" ignition) are reduced to exactly one dwell period per combustion event. The other manner in which NOD differs from true dwell is that a NOD period begins after the previous firing has occurred (hence the non-overlapping dwell designation). A pulse which begins each NOD period is designated NODP in FIG. 4, and the logic for generating this signal is shown in FIG. 5. With reference to FIG. 5, the DWELL signal (negative-going pulse) from each of primary coil is sent to the appropriate logic block according to the firing sequence of the ignition. Twelve logic unit would be employed in this configuration, though only four numbered 50–56 are shown for discussion purposes. Each logic unit contains a latch (flip-flop) and other common logic gates. At any given time, only one of the logic units is "armed", that is, enabled to process the dwell pulse. When the armed logic unit sees a negative pulse, it passes that pulse out to arm the next logic unit, and disarms itself. Thus, a logic unit will reject subsequent dwell pulses from the same coil (i.e., "multi-strike" ignition), to avoid double counting a single combustion event. Only after every other active logic unit has been armed and triggered in turn will the original logic unit be armed again and ready to accept another dwell pulse from its coil. Feedback from the last active logic unit to arm the first logic unit is accomplished by a multiplexer 58 that selects only one of the 11 remaining logic units, depending on the value of #COILS, the 4 bit code identifying the number of coils detected, as discussed earlier. In the example of FIG. 4, logic unit 8 would be selected to arm log-in unit 1. The negative-going outputs of the logic units are combined in an AND gate 60 to form the NOD pulse, and its leading (falling) edge triggers a pulse generator 62 to produce the signal NODP of FIG. 4.

The second function programmed into the PLD 28 is a pattern generation function used to decide which of the firing events are scheduled to be defeated. This is accomplished by creating a KILL SIGNAL based on counting NODP pulses. Other inputs are the user settings, indicating the type of misfire pattern (MODE) and the misfire interval. The PLD incorporates two pattern generators with distinct user controls so a user may enable a misfire according to either (or both) patterns at any time. The two pattern generators facilitate quickly changing patterns during a test, and permits interesting patterns to be generated by activating both generators simultaneously. For example, generating misfires periodically every $25^{th}$ firing while also generating misfires every $23^{rd}$ firing yields spacings between neighboring misfires which vary widely.

The third function performed by the PLD is the production of an S_KILL signal for data recording, as mentioned earlier. This is accomplished by using multiple latches on the KILL signal. The synchronization signal employed in this stage is typically PIP, which rises at 10 degrees BTDC. The S_KILL signal always exhibits a fixed delay (in terms of number of PIP events) with respect to the creation of misfire.

The logic waveform of the principal signals is shown in FIG. 4 for an 8-cylinder engine. Some of the signals have an "A" and "B" version which refers to either odd or even numbering in the coil firing sequence (the A version is for coils 1,3,5,7; B is for coils 2,4,6,8.) This arrangement accommodates overlapping dwell and the large variation in spark advance, which can exceed more than one PIP period in extent (but always less than two PIP periods). In FIG. 4, KILLA is applied to the MOSFET controlling coils 1,3,5, and 7 and KILLB is applied to the MOSFET controlling coil 2,4,6, and 8. KILLA is shown as producing a misfire in the cylinder associated with coil 1. KILLA goes high on the falling edge of the NODP pulse associated with DWELL1 and goes low on the falling edge of the NODP pulse associated with DWELL3 and thus remains high for two NODP periods. Similarly, KILLB is shown producing a misfire in the cylinder associated with coil 8.

Both the S_KILLA and S_KILLB logic signals are recorded by the data acquisition system along with the data used to diagnose misfire. The target (FAULT) for training a neural network to detect misfire is derived from these two S_KILL signals by alternately selecting either "A" or "B", depending on whether an odd or even coil is firing. The misfire detection is based on diagnostic variables (typically engine speed, load, crankshaft acceleration, and cylinder identification—see, for example, U.S. Pat. No. 5,732,382).

Table 1 contains a short segment of event-based data from an 8-cylinder engine at idle. Being event-based, the data is organized into one row per PIP interval. The variables, RPM, LOAD, and SEQ, are engine speed, engine load, and cylinder identification, respectively. These are the engine diagnostic parameters recorded for network input. The table also shows the S_KILLA and S_KILLB signals from the misfire generator, and the neural net target FAULT, derived from the S_KILL signals based on the variable SEQ.

TABLE 1

| RPM | LOAD | SEQ | ACCEL | S_KILLA | S_KILLB | FAULT |
|---|---|---|---|---|---|---|
| 1476.1 | .44 | 6 | 102.3 | 0 | 0 | 0 |
| 1475.5 | .44 | 7 | −173.2 | 1 | 0 | 1 |
| 1460.4 | .45 | 8 | 89.7 | 1 | 0 | 0 |
| 1481.1 | .45 | 1 | 108.4 | 0 | 0 | 0 |
| 1489.7 | .45 | 2 | 107.5 | 0 | 0 | 0 |
| 1500.8 | .46 | 3 | 92.4 | 0 | 0 | 0 |
| 1509.3 | .46 | 4 | 106.8 | 0 | 0 | 0 |
| 1519.6 | .45 | 5 | 65.5 | 0 | 0 | 0 |
| 1524.9 | .46 | 6 | −184.1 | 0 | 1 | 1 |
| 1511.5 | .46 | 7 | 63 | 0 | 1 | 0 |
| 1517.2 | .47 | 8 | 102.5 | 0 | 0 | 0 |
| 1532.8 | .47 | 1 | 105.1 | 0 | 0 | 0 |

RPM is basically the same as engine speed, except that it is calculated from a precise measure of the elapsed time (in microseconds) between PIP events (falling edge to falling edge), as opposed to the background loop calculation of engine speed. Hence, RPM contains the subtle variations required to detect misfire, as seen most clearly in its derivative ACCEL. Engine speed may be used as a rationality check on the RPM calculation.

The FAULT calculation yields a Boolean value based on S_KILLA, S_KILLB, and SEQ to indicate the locations of induced misfires in the file. The analog values of the S_KILL signals are nominally either 0 or 5V; hence, a logic threshold of 2.5V is reasonably chosen, as described in the following pseudo-code defining the FAULT algorithm:

if SEQ is odd then
      if S_KILLA>2.5 then FAULT=1 else FAULT=0 else
      if S_KILLB>2.5 then FAULT=1 else FAULT=0.

The empirical method used to determine which of the S_KILL signals should be associated with odd or even SEQ is quite simple, but requires some explanation. Examination of the data in Table 1 reveals that each misfire causes either S_KILLA or S_KILLB to go high for two consecutive measurements. The first of each pair of high values in the S_KILLA column corresponds to an odd value of SEQ, whereas the first of each pair in the S_KILLB column corresponds to an even value of SEQ. Thus, the FAULT algorithm uses the S_KILLA variable when SEQ is odd, and the S_KILLB variable when SEQ is even.

A consideration in performing this test is illustrated in FIG. 5, which shows the timing of PIP relative to the DWELL signal from a coil primary. PIP rises at 10 deg BTDC, and ignition (indicated by rising edge of DWELL) typically occurs shortly before, though this spark advance varies greatly according to engine operating conditions. At idle, ignition almost certainly occurs between the falling edges of PIP immediately before and after rising PIP, e.g., between 55 deg BTDC and 35 deg ATDC for an 8-cylinder engine. This condition must exist when collecting data to determine which of the recorded S_KILL signals is associated with odd/even SEQ, as just described.

However, once this odd/even test in the FAULT calculation has been properly determined, the algorithm will continue to give the proper result even if ignition occurs as early as the second falling PIP before TDC (145 deg BTDC for an 8-cylinder engine). This is reassuring, given that newer ignition systems support a much wider range of spark advance than formerly possible. FIG. 5 graphically indicates the acceptable range of spark advance during tests to establish the proper FAULT algorithm, and the wider range over which the "calibrated" FAULT algorithm will correctly operate.

While the best mode for carrying out the present invention has been described in detail, those familiar with the art to which this invention relates will recognize various alternative designs and embodiments for practicing the invention as defined by the following claims.

What is claimed is:

1. Apparatus for connection with an engine ignition system for causing an engine cylinder to misfire, said ignition system including a coil having a primary winding and a secondary winding and further including a coil driver connected with said primary winding for controlling current flow in said primary winding; said apparatus comprising:

a series network comprising a voltage breakdown device and a switching device, said network connected in parallel with said coil driver;

a signal generator for generating a misfire signal for controlling the state of said switching device to selectively initiate a misfire.

2. The apparatus of claim 1 wherein the timing of said misfire signal is based on logic signals derived from ignition primary signals.

3. The apparatus of claim 2 wherein said signal generator provides a signal indicative of which cylinder firing event was intentionally defeated.

4. The apparatus of claim 1 wherein said voltage breakdown device is a zener diode.

5. The apparatus of claim 1 wherein said switching device is a MOSFET transistor.

6. The apparatus of claim 1 wherein said voltage breakdown device is a zener diode and said switching device is a MOSFET transistor.

7. The apparatus of claim 1 further comprising a diode having an anode connected to a junction between said voltage breakdown device and one side of said primary winding and a cathode connected with said coil driver, an inductor connected between the cathode of said diode and the other side of said primary winding for causing a voltage spike to appear at said coil driver when a misfire is initiated.

8. The apparatus of claim 1 wherein said signal generator is responsive to said ignition primary signals for developing a non-overlapping dwell signal representing a single dwell period per combustion event, and includes means for generating a pulse at the beginning of each dwell period, and for creating said misfire signal based on counting said pulses.

9. A method of inducing cylinder misfire comprising a sequence of the following steps:

sensing the voltage at a point of connection between a primary coil winding and a primary coil winding driver of an engine ignition system;

detecting the beginning of an ignition dwell period and in response to said detection;

providing a current path in parallel with said coil driver for a period greater than said dwell period to gradually lower the current flowing in said primary coil winding at the termination of said dwell period.

10. The method of claim 9 further comprising the step of:

generating a voltage spike comparable to the flyback voltage normally expected from the coil primary winding at the termination of said dwell period for ignition diagnostic purposes.

* * * * *